United States Patent [19]

Johnston

[11] 4,222,271

[45] Sep. 16, 1980

[54] DIGITAL FLUIDIC OUTPUT FORCE BALANCE ACCELEROMETER

[75] Inventor: James V. Johnston, Huntsville, Ala.

[73] Assignee: The United States of America as represented by the Secretary of the Army, Washington, D.C.

[21] Appl. No.: 11,480

[22] Filed: Feb. 12, 1979

[51] Int. Cl.³ .............................................. G01P 15/03
[52] U.S. Cl. ........................................ 73/515; 73/521
[58] Field of Search ................. 73/515, 516, 503, 521

[56] References Cited

U.S. PATENT DOCUMENTS

| | | | |
|---|---|---|---|
| 3,114,267 | 12/1963 | Mundo, Jr. | 73/516 R |
| 3,315,531 | 4/1967 | Grimland | 73/515 |
| 3,490,293 | 1/1970 | Evans | 73/515 |
| 3,672,231 | 6/1972 | Shinn et al. | 73/515 |

Primary Examiner—James J. Gill
Attorney, Agent, or Firm—Nathan Edelberg; Robert P. Gibson; James T. Deaton

[57] ABSTRACT

A digital fluidic output accelerometer which has a proportional fluid amplifier for balancing forces acting on a mass which is rotatably mounted on air bearing means and has a digital fluidic output which produces digital signals that are proportional to acceleration of the device.

7 Claims, 1 Drawing Figure

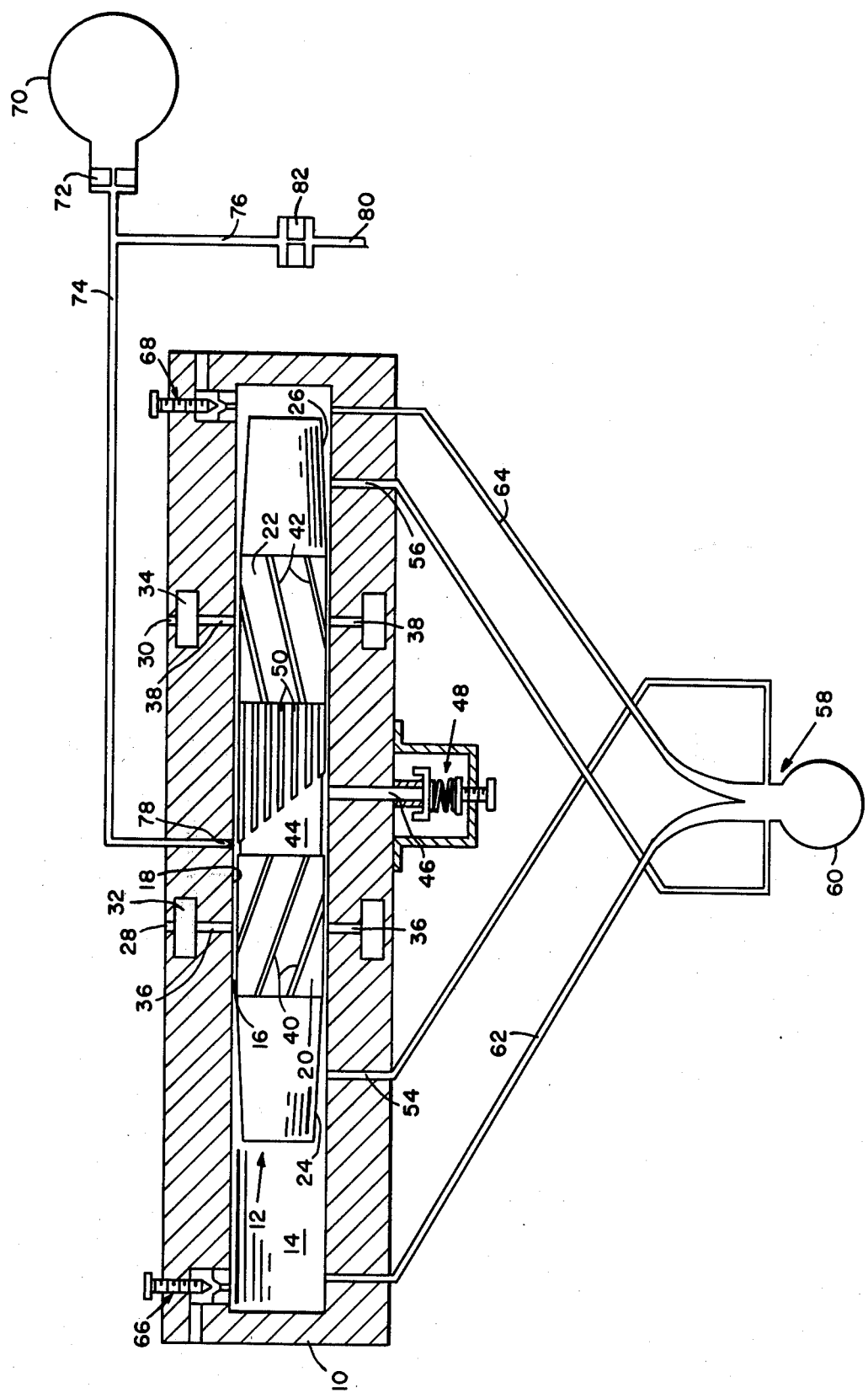

DIGITAL FLUIDIC OUTPUT FORCE BALANCE ACCELEROMETER

DEDICATORY CLAUSE

The invention described herein may be manufactured, used, and licensed by or for the Government for governmental purposes without the payment to me of any royalties thereon.

BACKGROUND OF THE INVENTION

There have been no known developments of fluidic digital output accelerometers. Several companies have developed fluidic computers that require pulse flow inputs to achieve a fluidic digital output. Fluidic analog to digital fluid amplifiers have been developed and built. The major drawbacks of these devices so far has been the scale factor range and sensitivity. Additionally, the basic design of fluid accelerometers has required a proof mass that moves on a flexure members or jewel pivot that operates a very fine needle valve or throttle. Other errors are entered when cross axis acceleration is applied since the pivots and flexure devices respond to these unwanted motions. Additionally, these devices suffer from errors when they are rotated. Therefore, there is a need for a digital fluidic output accelerometer device which is stiffly constrained to move in only one axis and is not affected by rotational motion about the acceleration axis.

Therefore, it is an object of this invention to provide a particular arrangement of a fluidic digital output accelerometer which overcomes the problems encountered with frictional forces and torques in moving fluid valves.

Another object of this invention is to provide a digital fluidic output accelerometer in which the mass responding to acceleration is mounted on air bearing means.

Still another object of this invention is to provide a device which utilizes a proportional fluid amplifier in conjunction with a floating mass to produce a digital fluidic output which has a signal that is proportional to acceleration of the device.

Other objects and advantages of this invention will be obvious to those skilled in this art.

SUMMARY TO THE INVENTION

In accordance with this invention, a digital fluidic output accelerometer is provided for measuring vehicle motion and includes a free floating proof mass which is rotated or spun on an acceleration sensitive axis in a central housing. The proof mass is rotated on hydrostatic bearings which provide frictionless support for axial motion of the mass. A fluidic jet nozzle is located in the central housing of the accelerometer and directs a small jet of air perpendicular to a serrated section of the proof mass. These serrations run longitudinal in length along the proof mass near the center thereof and are of a constantly varying length or ramp shape. As the proof mass translates due to acceleration forces, these serrations are moved under the jet nozzle. The serrations come into close proximity with the jet nozzle thereby creating a restriction to the flow. The reduced output at the jet nozzle causes an increase in pressure and pulse flow at an output port. The amount of translation also determines the number of serrations that will come under the jet nozzle. Therefore, as the spin rate of the proof mass is maintained, the number of output pulses during one revolution of the proof mass is proportional to the applied acceleration. The proof mass is maintained in a force balance arrangement by utilizing a proportional control fluid amplifier which receives its control signal from tapered ramps at opposite ends of the proof mass. As the proof mass translates, the taper on the ramps change the control flow at opposite ends of the proof mass thereby returning it to the initial balance position.

BRIEF DESCRIPTION OF THE DRAWING

The single FIGURE of the drawing is a schematic sectional view of a digital fluidic output accelerometer in accordance with this invention.

DESCRIPTION OF THE PREFERRED EMBODIMENT

Referring now to the drawing, a digital fluidic output accelerometer in accordance with this invention includes a housing 10 which is schematically illustrated and has a cylindrical proof mass 12 mounted in chamber 14 of housing 10. Proof mass 12 is disposed for moving axially in chamber 14 and is rotatably mounted on an air bearing space 16 by cylindrical surfaces 18 of the housing and spaced surfaces 20 and 22 of proof mass 12. Proof mass 12 also has tapered ends 24 and 26. Housing 10 has supply passages 28 and 30 for supplying fluid under pressure to circumferential chambers 32 and 34 which supply fluid through a plurality of orifices 36 and 38 to air bearing space 16. Surface 20 has a plurality of grooves 40 therein and surface 26 has a plurality of grooves 42 therein. When fluid is supplied through orifices 36 and 38 into air bearing space 16, the fluid is communicated through grooves 40 and 42 to cause proof mass 12 to be rotated. The fluid passing through grooves 40 and 42 is communicated into the central region around central portion 44 of proof mass 12. Fluid is exhausted through passage 46 and exhaust valve regulator 48. The rotating speed of proof mass 12 is regulated and controlled by the supply pressure supplied to chambers 32 and 34 and by regulating the fluid flow across the bearing area 16 with the use of adjustable spring control exhaust valve regulator 48. Proof mass 12 is spun up to a relatively high speed of approximately 500 rpm and maintained at a substantially constant rate. Proof mass 12 also has in center section 44 serrations 50 that run longitudely along the axis of the proof mass. The length of these serrations vary in a ramp function all the way around the circumference of the proof mass. The proof mass is also equipped with tapered ends 24 and 26 that provide a variable orifice with the chamber wall to increase or decrease the orifice to jet sensing ports 54 and 56. Sensing ports 54 and 56 are connected as illustrated to proportional fluid amplifier 58. Fluid amplifier 58 is provided with a pressure source 60 for providing pressurized fluid under constant pressure to the fluid amplifier. Outputs 62 and 64 from fluid amplifier 58 are directed into chamber 14 at opposite ends of housing 10 and proof mass 12. Adjustable exhaust orifice throttles 66 and 68 are located at each end of housing 10 to exhaust fluid from the opposite ends of chamber 14. Exhaust orifice throttles 66 and 68 are adjusted to balance the end pressures and zero proof mass 12 with zero input acceleration. Adjustment of throttles 66 and 68 together will adjust the dampening and the frequency response of the overall unit.

A constant pressure source 70 supplies fluid through orifice 72 into conduits 74 and 76. Fluid flowing from source 70 to conduit 74 is communicated through jet nozzle 78 into the central area 44 of proof mass 12. When raised portions 50 of the serrations are moved as a result of the proof mass responding to acceleration, the raised portions 50 pass under nozzle 78 and the flow of fluid such as air is partially restricted. This causes the pressure in conduit of air line 76 to rise and cause a corresponding increase at output 80 which has been communicated through restrictor 82.

As shown in the illustration of the drawing, raised portions 50 are illustrated in one direction only. Therefore, this particular application responds to only one direction of movement of the unit. However, if the raised portions 50 were duplicated on each side of nozzle 78, the device would work to produce a digital output when moved in either direction. Furthermore, an optical pickoff could be used with this device if raised portions 50 were replaced by reflective strips and an electrical pickoff used to detect the reflective strips.

In operation, with body 10 mounted on a missile, and with fluids such as air being provided to supply passages 28, 30, source 60 and source 70, proof mass 12 will be centered in chamber 14 and rotating at the design speed for the proof mass. Also, proof mass 12 will be mounted on the air bearing and the proof mass will be in a floating condition. When an acceleration is applied to housing 10 toward the right as illustrated in the drawing, proof mass 12 will lag behind the body translational acceleration. As proof mass 12 moves to the left due to acceleration, jet nozzle 78 will begin to be pulsed by the longest projections of raised portions 50. As the proof mass moves further to the left, more raised portions 50 will come under jet nozzle 78. Since proof mass 12 is spinning at a constant rpm, the number of pulses produced at output 80 per revolution of proof mass 12 will be proportional to the distance proof mass 12 has moved in housing 10. As the proof mass moves to the left, sensing port 56 detects a larger gap due to ramp 26 being moved to the left and a corresponding motion on the left side reduces the gap for port 54. With the lower pressure in the portion of chamber 14 at the right end of proof mass 12 as opposed to the left end of proof mass 12 due to movement of proof mass 12 to the left relative to housing 10 in response to acceleration and due to a wider gap at port 56, fluid amplifier 58 will be caused to provide a larger proportion of flow through passage 62 from supply 60 and cause this flow to be directed to the left end of chamber 14. This flow will cause an increase in the chamber pressure at the left end and a corresponding lessening of the supply through passage 64 to the right end of chamber 14. These unequal pressures at both ends of proof mass 12 creates a rebalance force to bring the proof mass back to a center position when the acceleration is removed.

As can be seen, this invention includes a free floating proof mass 12 which is rotated on frictionless, hydrostatic bearings for axial motion of the proof mass and digital pulsing of output signals at 80. The hydrostatic bearing is not equipped with thrust pads and is therefore constrained by differential pressure control. Proof mass 12 is completely supported free of the case and there are no springs or wires attached to the proof mass to cause restraints and errors. Since proof mass 12 is spinning at a relatively high speed, the case or housing 10 can be rotated around the proof mass spin axis without any spin sensitivity effects. Proof mass 12 is built symmetrical and as temperture changes, the length of proof mass 12 will change but neither its weight nor any spring contacts normally associated with accelerometers of similar type will change since only the rebalance forces keep the mass centered. Also, since proof mass 12 is spinning, all non-symmetrical imbalances of proof mass 12 are averaged over each revolution of the mass and do not contribute error signals.

I claim:

1. A digital output accelerometer comprising a housing having a chamber therein, a proof mass rotatably mounted therein by frictionless bearing means, means for rotating said proof mass up to a predetermined operating speed, means for balancing pressures at opposite ends of said proof mass, and fluid pickoff means including rotating means on a portion of said proof mass and fixed means on said housing and cooperating and producing a fluidic digital output in response to acceleration forces applied to said housing and rotation of said proof mass relative to said housing.

2. A digital output accelerometer as set forth in claim 1, wherein said frictionless bearing means includes two spaced apart cylindrical surfaces on said proof mass and a corresponding cylindrical surface on said housing to define a frictionless bearing space between said proof mass and said housing, and means for providing fluid to said frictionless bearing space and for exhausting fluid from said bearing space.

3. A digital output accelerometer as set forth in claim 2, wherein said spaced apart cylindrical surfaces have grooves therein to cause said proof mass to be rotated about its axis when fluid is supplied to said frictionless bearing space.

4. A digital output accelerometer as set forth in claim 2, wherein said means for exhausting fluid from said bearing space includes an exhaust regulator mounted on said housing.

5. A digital output accelerometer as set forth in claim 3, wherein said means for balancing pressures includes a proportional fluid amplifier with outputs of said proportional fluid amplifier connected to said chamber at opposite ends of said chamber and jet sensing ports that are throttled by structure of said proof mass, said jet sensing ports being connected into opposite sides of said proportional fluid amplifier for causing control of flow out said outputs, and exhaust orifice throttles connected to said chamber at opposite ends for providing exhausts from said chamber.

6. A digital output accelerometer as set forth in claim 5, wherein said rotating means on a portion of said proof mass includes said proof mass having a central portion with longitudinal raised portions that run along the axis of the proof mass and the length of said raised portions varying in a ramp function all the way around the circumference of said proof mass, said fixed means on said housing including a jet nozzle opening into said chamber adjacent said central portion, a pressure source connected across a restrictor to said jet nozzle and a restricted output connected between said resistor and said jet nozzle.

7. A digital output accelerometer as set forth in claim 1, wherein said rotating means on a portion of said proof mass includes said proof mass having a central portion with longitudinal raised portions that run along the axis of said proof mass and the length of said raised portions varying in a ramp function all the way around the circumference of said proof mass, said fixed means on said housing including a jet nozzle opening into said chamber adjacent said central portion, a pressure source connected across a restrictor to said jet nozzle and a restricted output connected between said restrictor and said jet nozzle.

* * * * *